United States Patent
Tse

(10) Patent No.: US 9,104,880 B2
(45) Date of Patent: Aug. 11, 2015

(54) APPARATUS FOR E-LEARNING AND METHOD THEREFOR

(76) Inventor: Ho Keung Tse, Hong Kong (HK)

( * ) Notice: Subject to any disclaimer, the term of this patent is extended or adjusted under 35 U.S.C. 154(b) by 35 days.

(21) Appl. No.: 13/694,934

(22) PCT Filed: Jul. 19, 2011

(86) PCT No.: PCT/IB2011/001679
§ 371 (c)(1),
(2), (4) Date: Mar. 29, 2013

(87) PCT Pub. No.: WO2012/010953
PCT Pub. Date: Jan. 26, 2012

(65) Prior Publication Data
US 2013/0227682 A1    Aug. 29, 2013

(30) Foreign Application Priority Data

| Jul. 19, 2010 | (GB) | 1012084.8 |
| Jul. 21, 2010 | (GB) | 1012264.6 |
| Jul. 26, 2010 | (GB) | 1012487.3 |
| Jul. 28, 2010 | (GB) | 1012720.7 |
| Jul. 30, 2010 | (GB) | 1012896.5 |
| Oct. 6, 2010 | (GB) | 1016798.9 |
| Oct. 18, 2010 | (GB) | 1017569.3 |
| Nov. 22, 2010 | (GB) | 1019739.0 |

(51) Int. Cl.
| G06F 21/00 | (2013.01) |
| G06F 21/60 | (2013.01) |
| G06F 21/50 | (2013.01) |
| G06F 17/30 | (2006.01) |
| G06K 9/00 | (2006.01) |
| G06F 21/10 | (2013.01) |
| G06F 9/54 | (2006.01) |

(52) U.S. Cl.
CPC .......... *G06F 21/60* (2013.01); *G06F 17/30722* (2013.01); *G06F 17/30728* (2013.01); *G06F 17/30873* (2013.01); *G06F 21/50* (2013.01); *G06F 21/602* (2013.01); *G06K 9/00442* (2013.01); *G06K 9/00469* (2013.01); *G06K 9/00483* (2013.01); *G06F 9/543* (2013.01); *G06F 21/10* (2013.01); *G06F 2221/0724* (2013.01)

(58) Field of Classification Search
CPC ......... G06F 21/05; G06F 21/06; G06F 9/543; G06F 2221/0724; G06K 9/004
USPC ...................................... 726/26–33
See application file for complete search history.

(56) References Cited

U.S. PATENT DOCUMENTS

| 7,742,953 | B2 * | 6/2010 | King et al. | 705/26.1 |
| 8,666,961 | B1 * | 3/2014 | Qureshi et al. | 707/705 |
| 2005/0154992 | A1 * | 7/2005 | Chen et al. | 715/770 |
| 2005/0154993 | A1 * | 7/2005 | Chen et al. | 715/770 |
| 2009/0077658 | A1 * | 3/2009 | King et al. | 726/21 |
| 2009/0287988 | A1 * | 11/2009 | Cohen et al. | 715/204 |

OTHER PUBLICATIONS

Citation Based Plagiarism Detection—A New Approach to Identify Plagiarized Work Language Independently by Gipp et al; Publisher: ACM; Date: Jun. 13-16, 2010.*

(Continued)

*Primary Examiner* — Madhuri Herzog

(57) ABSTRACT

A method or apparatus for assisting a user to access a plurality of eBooks is provided. When a user accesses an eBook, the method or apparatus can assist the user to seek assistance from the Internet, or prepare homework, while at the same time, prevent plagiarisms of homework.

14 Claims, 3 Drawing Sheets

(56) References Cited

OTHER PUBLICATIONS

Heberling, Michael. "Maintaining academic integrity in online education." Online Journal of Distance Learning Administration 5.2 (2002).*

Jocoy, Christine L., and David DiBiase. "Plagiarism by adult learners online: A case study in detection and remediation." The International Review of Research in Open and Distributed Learning 7.1 (2006).*

Butakov, Sergey, and Vladislav Scherbinin. "The toolbox for local and global plagiarism detection." Computers & Education 52.4 (2009): 781-788.*

* cited by examiner

FIG.1

MONDAY July 12 2010

| | Subject | | | NOTES : |
|---|---|---|---|---|
| 1 | English | "Fundamental English" (09:00-09:50 am) (P.125) | "Spelling" (09:20-09:55 am) (P.113) | "Notes on English" (P.25) |
| | | | "Grammar" (09:07-09:43 am) (P.22) | |
| 2 | Geography | "Elementary Geography" (10:05-10:40 am) (P.17) | "Global Map" (10:10-10:30 am) (P.11) | "Notes on Geography" (P.57) |
| | | | "Climate Change" (10:05-10:45 am) (P.10) | |
| 3 | Biology | "Introduction to Biology" (11:10-11:56 am) (P.120) | "Blood Cells"(11:07-11:52 am) (P.31) | |
| 4 | English | "Fundamental English" (14:45-16:50 pm) (P. 24) | "Spelling" (14:57-16:30 pm) (P.51) | "Notes on English" (P.12) |
| | | | "e-Dictionary" (15:03-16:25 pm)- "door", "bed", "table", "ticket" | |

APPARATUS FOR E-LEARNING AND METHOD THEREFOR

FIELD OF THE INVENTION

The present invention relates to computer-based devices, and particularly, to devices which assists people in learning.

BACKGROUND OF THE INVENTION

With the advance of computing technologies, people at schools, colleges, or graduated and engaged in their respective careers, become increasingly rely on computers in their learning.

One objective of the present invention is to provide a method and apparatus to simplify the use of computing devices in accessing different documents in a related subject.

BRIEF DESCRIPTION OF THE DRAWING

FIG. 1 is a record of user learning activities, in table form, according to the present invention.

DETAILED DESCRIPTION OF THE PREFERRED EMBODIMENTS

Figure 2:
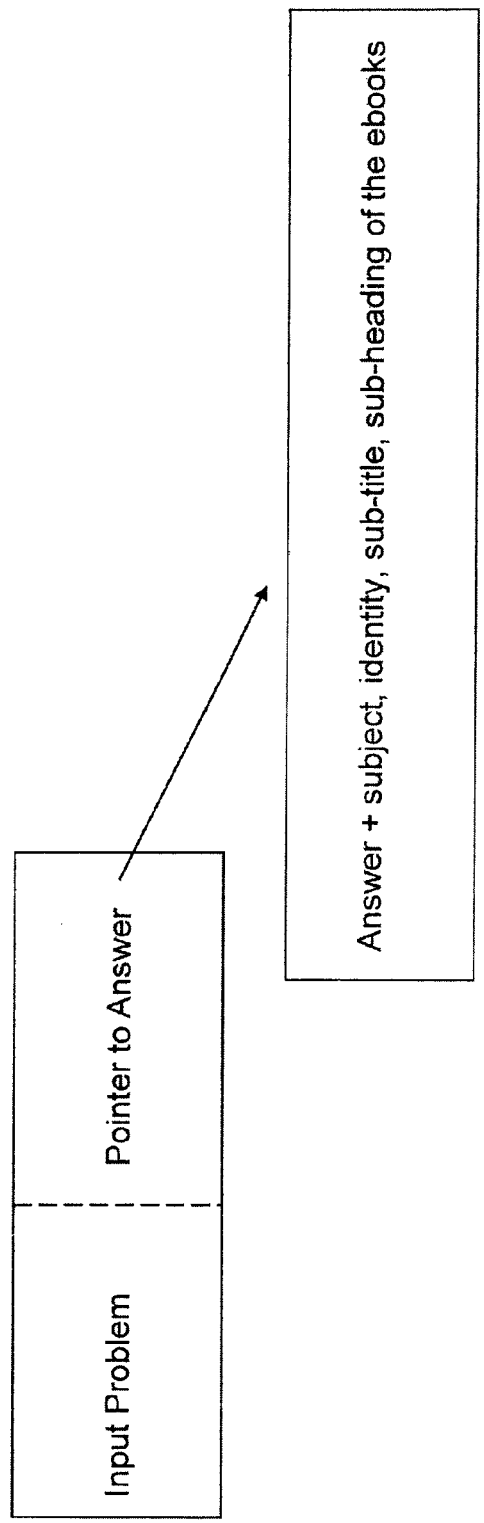
FIG. 2 is a schematic diagram illustrating the relationship between an input problem, and its corresponding answer in memory storage.

According to the present invention, there is provided a program for use on a computing device. The computing device contains a number of electronic books (ebooks), related to a number of different subjects.

When being executed, the program monitors the activities of a user of the computing device. It records the identities and date, time of ebooks being open on the device. By way of example, FIG. 1 illustrates such a record in table form automatically created by the program.

As shown in FIG. 1, on Jul. 12, 2010 the user of the device open an ebook "Fundamental English" in the time period 09:00-09:50 am, and in substantially the same time period, that is, 09:20-09:55 am, the user also open another ebook "Spelling". Further, the user also open ebook "Grammar" on 09:07-09:43 am.

These three ebooks are automatically grouped together by the program in item 1 of the table, so that in future, by simply clicking any part of item 1, program will automatically open the three ebooks, and open each of them at exactly the page the user last read, that is, P.125, P.113, P.22 and P.25 of the ebooks "Fundamental English", "Spelling", "Grammar" and "Notes on English", respectively.

The grouping of the ebooks can be based on various factors such as 1) the time periods the user open them, note that as the user may be a student attending learning sessions regularly, so the ebooks used within the same hour which may be a session for a particular subject, can be grouped together for the user's convenience, as this group may be repeatedly be used in the next session for the same subject; 2) the category or subject the ebooks pertain to, which may be determined from the title and abstract, or any sub-titles, headings, or any part or the entire contents of each ebook, and if an ebook being open is of a subject different than that of other ebooks in a group, it may be excluded from the group. And, item 1 is probably a group created after the user has attended an English session.

Alternatively, the program may create an item in the table, for each learning section that the user is supposed to attend in an electronic class schedule, by recording into an item the ebooks the user has open and last page opened, within the time period specified in the schedule for a corresponding learning session.

Further, if the user opens the electronic schedule to cause it to be displayed, and clicks a particular session in it, the program will determine whether that the session has an item associated with it.

If yes, then the user has attended the session some time earlier and may want to revise what has been taught. The program will automatically open all the ebooks in the item of the table, corresponding to the clicked session, and each to the last page opened.

If no, then the session should be the session the user is going to attend right now. The program will automatically open all the ebooks in an item of the table, corresponding to the last session the user has attended, for the same course/subject in the class schedule that the clicked session pertains to.

Note that, in the above, it would be advantageous for the program to monitor the activities of the user so as to determine whether an ebook being open by user for merely a brief reading thereof and then being maintained in the "open" status for an unnecessary long period of time is merely because the user forgets to close it after the display of its content being overlapped by another ebook or caused to be in a minimum mode, that is, with only a small icon representing it being displayed at an unnoticeable corner of the display of the computing device while its content not being shown in the display, or even that the user has left the computing device and engaged in some other activities, by skills well known to those in the art such as, the screen of the display of the computing device go to "power saving" mode with the backlight of the screen being switched off automatically, after no user input from keyboard or mouse for a predetermined period of time; so as to estimate the actual time the user spends on a particular ebook, if the actual time is insignificant, then the ebook should not be included into the related item.

Further, the program may create "subject" groups that each group contains all ebooks pertaining to a particular subject, such as "English", "Geography", or "Biology", so that when a user open an ebook of a particular subject, the program may automatically display icons respectively representative of all other ebooks in the same subject for the user to click to open, as the user may probably need to access to some other ebooks on the same subject as well. Further, the program may establish ranking for different ebooks in the same subject group, basing on statistics obtained in prior user activities, such as the frequencies a particular ebook is being open, and present the ebooks to the user in according to its ranking.

When studying with a number of ebooks open on the computing device, and the user comes across a problem, he may seek an answer to the problem by inputting the problem, by means of an input device of the computing device, which may be a keyboard or a mouse for selecting a block of text from an ebook, through Internet, to an electronic forum or the like. If the input problem itself or a part thereof is from an ebook, the computing device will automatically supply the subject of the study determined by the program by the method as mentioned above, identity of the ebook, such as title, as well as any sub-title, sub-heading of the ebook where the input problem or a part thereof pertains to, together with the input problem itself, to the electronic forum. Alternatively, the computing device may supply the subject of the ebooks currently open and/or with its content being displayed on the screen of the computing device, and the identities of those ebooks, together with the input problem itself, to the electronic forum.

Note that the problem is defined by the input problem and those information related to the ebooks.

The electronic forum, will use all the information it received, including those information related to the ebooks, to search from its data base of answers to all past problems, for a predetermined limited number of closest past problems and their corresponding answers for the user, and send the search result to the computing device, for to be displayed to the user.

Specifically, the electronic forum will first search from its data base of past problems for an exact match for the input problem, and if there is such a match, then provide the user its corresponding answer. Further, it will also perform a "key word search". Specifically, it discards those generally used words, such as, "a", "the", "is", from the input problem and obtain key words therein, then use the key words to search from all the past problems in its data base, a predetermined number of past problems that are most related to the input problem, and provide the user their corresponding answers.

If there is a right one in the answers, the user may click to indicate which one is the right answer and the database of the electronic forum will be updated by raising the ranking of the answer for that problem accordingly. On the other hand, if none is the right answer, the electronic forum may post the problem to await other people to input a right answer to it, and then update its database accordingly. The electronic forum may post the input problem to only those people who also has a computing device connected to the forum through Internet, and opening the same ebook, or opening a different ebook but of the same subject, as that of the user inputting the problem.

Alternatively, the electronic forum may be a computer-based system which, after receiving all the information, including those information related to the ebook, such as subject, title, sub-title, identity, as mentioned above, will first submit only the input problem to a search engine such as google, and transfer the search result from the search engine to the user computing device, for to be displayed to the user. If there is a right item or more in the search result, the user would click to indicate which one(s) is the right answer. In this way, the electronic forum can establish its database of answers to different problems gradually.

And, as seen from above, in the database thus created, the problem is actually defined by a set of information, namely as, the input problem, as well as those information related to the ebook, such as subject, title, sub-title, identity, as mentioned above, even though the information submitted to the search engine may only be the input problem. And, answers corresponding to different problems are stored in respective different storage locations, and accordingly, the electronic forum will retrieve answers for a problem as defined by the set of information as mentioned above, from the storage location corresponding to the problem. Note that the electronic forum may also provide answers from other sources, for different related problems, such as problems with the same input problem, but related to different ebooks, but present them to the user in a lower ranking and a lower priority.

In using a search engine, it will perform a search basing on the search word(s) which may be obtained by the electronic forum from the problem input, and present a number of search result items each containing passages, phrases, snippets extracted from the original web page associated with each search result item and should desirably be containing the search words, for the user to decide whether to click the hyperlink of the search result item, so as to have a look at the original web page containing the extracted passages, phrases, snippets.

Upon the user clicks on the presented search result items and the number of clicked search result items reaches a predetermined limit, such as five, the program of the present invention will re-establish the priorities of the search result items basing on the clicked search result items. It will do this by first eliminating some very general words, such as "the", "a", "and", "are" etc., from the above-mentioned extracted passages, phrases, snippets of the clicked search result items, and then it will create some new search word(s) from the extracted passages, phrases, snippets after the elimination. Those word(s) appear the highest number of times in the extracted passages, phrases, snippets of the different clicked result items, will become new search word(s).

The program will then make use of the original search word(s), together with the newly created searched word(s) to re-establish the priorities of the searched result items presented to the user. Note that the establishment of the new priorities will be basing on the original entire web page content associated with the search result items, that is, the content containing the more search word(s), original or newly generated by the program, will be, given the higher priority. However, it is also possible that, the newly generated searched word(s) may be used to determine the new priorities of the search items in the search result, basing on the appearance or non-appearance of the newly generated searched word(s) in the extracted passages, phrases, snippets of the search result items.

On the other hand, the extracted phrases, snippets and passages shown in the search result items that being presented to the user but not being clicked, or in the search result items that being presented to the user at a more prominent position (for eg., at a higher position on a visual display) for being assigned a higher priority than a clicked item originally, but not being clicked, may also be used to generate unwanted search word(s) in the manner same as the generation of new search word(s), as explained above. Any search result items containing the unwanted search word(s) will be given a lower priorities.

The new priorities so created may be used to rearrange the order from top to bottom, the search result items to be presented to the user, with the higher priority ones be placed at a upper position, or alternatively, be used in pre-fetching web-page contents into the user's computing device, with those web-page contents corresponding to the search result items with a higher priorities be pre-fetched first.

Alternatively, all the past input problems may be stored in a first storage, with corresponding "Pointer to Answers" pointing to locations of their corresponding answers and related ebook information as mentioned above, such as, subject, identity of the ebook, sub-title, sub-heading, in a second storage, for detail please refer to FIG. 2. And, if basing on the content of an input problem, a key word search as described above is performed on the first storage and find out a past input problem which may be related, then the electronic forum will use the corresponding "Pointer to Answer" to fetch from the second storage, the corresponding answer and ebook information, such as, subject, identity, sub-title, sub-heading of the ebooks. Then, the electronic forum will assign a ranking to the answer, depending on the relevancy of ebook information of the past input problem to that of the input problem, if they are related to the same ebook, then a higher rank, if they are just of the same subject, then lower rank, and so on. And, the ebook information related to the answer to past input problem will not be supplied to user or user's computing device, only the answer will.

Note that, if for input problems with the exactly the same text, but come from a different ebook of a different subject and so on, the answer to it come out from the database may be completely different, as even the search result come from a search engine for the identical text might be the same, the user reading a different ebook with different subject would probably interested in different search result items from the same search result, and click the right answer(s) of his own choice differently, and consequently, leading to the database to establish a higher ranking for the answer to the problem.

Note that the raise in ranking may be dependent on the education level and age of the user, as a user of higher age and education would probably pick the better answer. Such personal data may be received from the user when the user purchased the ebook, and downloaded the same from Internet or the like. The electronic forum may keep a record of the serial numbers of ebooks purchased and the education levels and ages of the buyers, and the aforesaid ebook information related to an input problem includes the serial number of the ebook and further the electronic forum use the serial number to search from its record the buyer of the ebook and from this, obtain the education levels and ages of the user who submits the input problem and picks the right answer, as the user and the buyer should be the same person.

On the other hand, if the answer is supplied by another user connected to the electronic forum through his internet computer, storing ebooks purchased, then the ranking of the answer will similarly be dependent on the education level and age of that another user who should be the buyer of those ebooks, and has his education level and age on the record of the electronic forum.

In the above, the term "ebook" refers to book in digital form, it should be noted that the same term is often used by some people in the art to refer to portable devices incorporating e-Paper (a proprietary technology of E Ink Corporation), for displaying those ebooks in digital form. Herein below those portable devices will be referred to as ebook devices.

In one embodiment, the computing device may be comprising of one conventional desktop computer and one ebook device, both may be capable of allowing a user to open a plurality of ebook simultaneously.

In this case, a user may prefer to read one ebook A on the ebook device X, while read another ebook B on the computer Y, for easy cross-reference or the like. Note that ebook A or ebook B may be other type of document such as a webpage.

To facilitate the user in editing a summary or note or the like on both ebooks A and B, on computer Y, the above program will automatically open another copy of ebook A, as ebook A', on the computer Y, and synchronize the ebook A' with ebook A, such that when the user reading a particular page of ebook A, and desires to copy a part thereof to the summary or note, then he may conveniently use book A' open in computer Y to do the job.

Specifically, the program consists of two sub-programs separately executed on the ebook device X and computer Y, for performing their respective functions in ebook device X and computer Y as described below, and in the description below, many of the functions of program will require communication between the two sub-programs and this can be achieved by communications link, such as, WIFI or Bluetooth, established between the ebook device X and computer Y. The program will cause eBook A' to be in a minimum mode, so as not to disturb the user from reading eBook B. And, when a user turns the page of ebook A to a new page, then the program will turn the page of ebook A' to the same page number automatically, or if the user uses the cursor to select a block of text of ebook A, then the corresponding block of text of ebook A' will be selected too, in the computer Y, and ready for copying or translation etc. In this way, the user while on one hand can enjoy reading ebook A on the ebook device X with all the benefits he can obtain from the high quality e-Paper technology, he can easily switch to computer Y to perform any operation on ebook A', such as "searching for a phrase", do translation with an e-dictionary etc, just as easy as if he was reading ebook A on computer Y, by just clicking an icon representative of ebook A' on the display of computer Y, to maximize it so that ebook A' will occupy the full screen of the display.

And similarly, if the user turns ebook A' on computer Y to a particular page, then the program will automatically cause ebook A on ebook device X to turn to that same page.

Note that if the user touches any part of the touch screen or any button of the ebook device, with or without causing any action to be performed by the ebook device itself, such as touching the screen at exactly where the cursor is, therefore causing no change in position of cursor, the program will take the user as having come back to read the ebook A on ebook device X and therefore automatically revert the ebook A' back to minimum mode (that is, the content of the ebook not being displayed on the screen) and cause ebook B back to maximum mode (that is, the content of the ebook being displayed on the screen), on computer Y.

In a still further embodiment, the ebook device may include a homework function, so as to facilitate a student to do his homework assigned by a teacher. The homework function records the method of input or entry such as by typing, handwriting recognition (if the ebook device is capable of receiving and recognizing user hand-writing images created by moving a stylus or even a finger of the user on the touch screen of the ebook device), copying from references and name of the references (in case the reference is a web-page, then the URL of the web-page); the time (such as starting time, ending time, time duration) of the entries or input etc., identity of the computing machine(s) used in making the entry, in a confidential record inside the homework file, unalterable by the student. It is unalterable in the sense that the user cannot change the content of the confidential record other than causing it to be deleted by the ebook device, by first deleting the entry or input by the user himself.

Typically, a piece of home work may be composed of a number of parts each input or entered by a different method and in different time, then for each of them, there will be a respective corresponding confidential sub-record in the record, for storing the method of input or entry, name of the reference, the time of the entry or input etc., identity of the computing machine(s) used.

Figure 3:
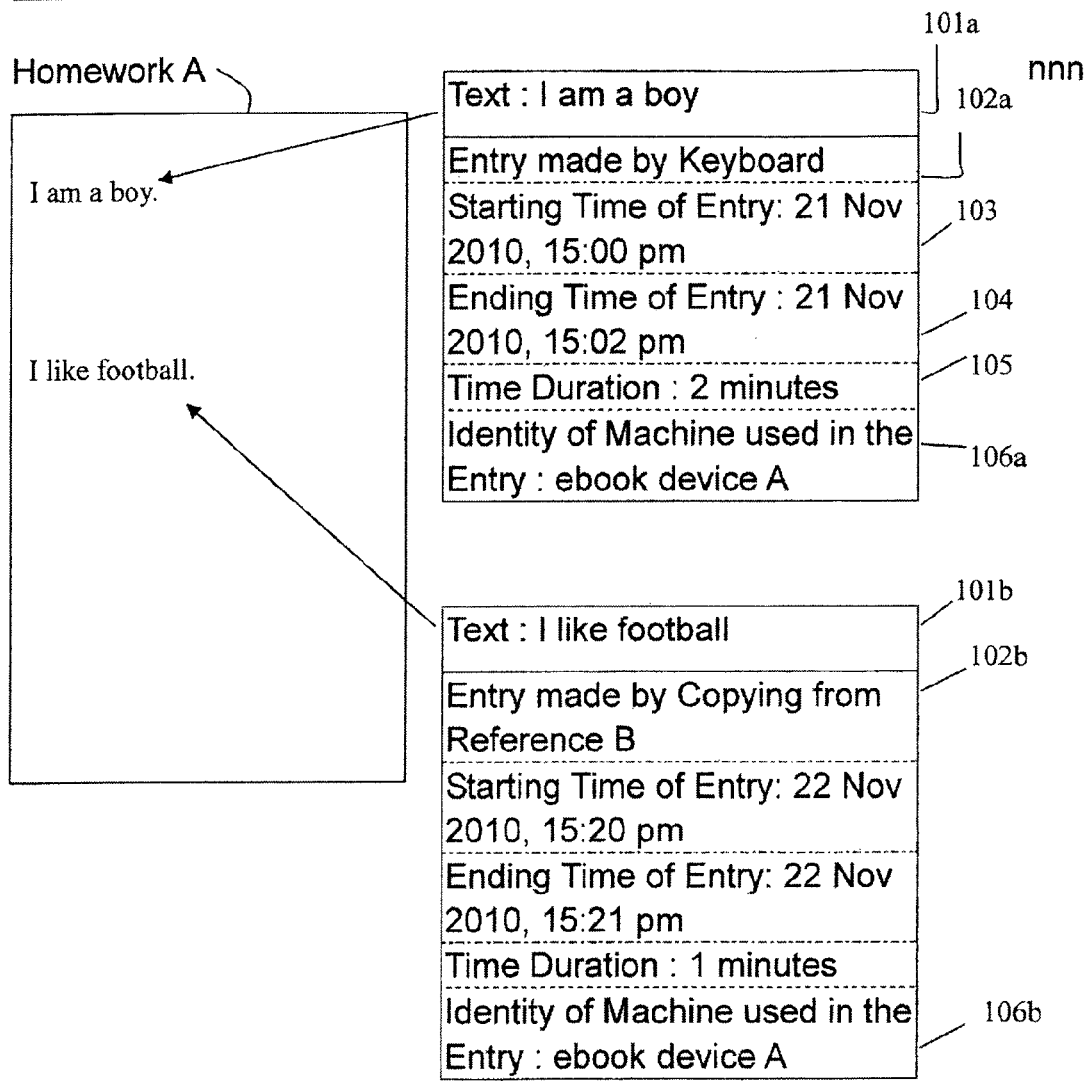
FIG. 3 is a diagrammatic view of an exemplary Homework A.

Refer to FIG. 3, which is a diagrammatic view of an exemplary Homework A, it includes texts "I am a boy" (101a) and "I like football" (101b) which will be displayed on the screen of the ebook device when the file of Homework A is open by a user, with an accompanying confidential record with items 102a, 103-105, 106a which will not be shown on the screen for the entry "I am a boy" (101a). As shown, the entry "I am a boy" (101a) and "I like football" (101b) is made by keyboard (102a) and by copying from Reference B (102b) respectively, by using ebook device A (item 106a and 106b), but on a different day.

The content of homework file edited by the student can be copied, in part or in full, into different homeworks for to be submitted to teachers, or into notes or summaries for personal study, with the corresponding confidential records or sub-records for the copied part, be copied into the corresponding confidential records of the different target homeworks or notes or summaries. Conversely, notes or summaries for personal study may also be copied in part or in full into a piece of homework in the same manner.

After the student have finished his homework, and submitted to the teacher. The teacher can determine from the confidential record whether the student has properly done his homework, or copied the homework file from another student, from the information of method of input or entry, time and identity of the computing machine(s) used (different computing machines may be identified by their CPUs, version of operation system, serial number, type of display card and LCD monitor, size of hard-disk, RAM space, etc) in the record, as even though the contents of electronic homework from different students may have little variations, the information in the record should be different if each of them do their homework independently. The determination can be performed by a computer by comparing the records of different student homeworks, automatically and alerts the teacher if copycat homework is found.

And, if a homework file is displayed on a ebook device for the teacher to review, the ebook device will display different parts therein with different input method used by the student who submits the homework, in different colours, or in different background colour, for e.g., those parts that are copied from references are displayed in red, and those are input by typing are in green, so as for easy distinguishing them.

In an even still further embodiment, it is provided a history program, to run on a computer device (for e.g., a computer or ebook device), for recording the input of a user to the computer device, by typing or hand-writing recognition, but not copying as the content being copied are most likely not created by the user himself, into a confidential history file in a storage of the user, such as USB storage. This can be done simply monitoring the signals received from keyboard, or touch screen, by skills well known to the art.

For an input less than a predetermined length, says, three words or ten characters, it may be ignored, otherwise, it will be saved together with all other information, including method of input, time and identity of the computing machine(s) used, in the confidential history file. And similarly to the confidential record as described above, the confidential history is unalterable by the user and encrypted.

In this way, all meaningful inputs of the user will be kept in the history file, regardless of whether it is a submission to an electronic education/study forum related to a discussion with peer students, or an input to a homework file.

Further, the history program is capable of displaying the saved user inputs on the screen of the computer device, in their chronological order, for the user to review, and should the user wish, he may copy any of the inputs, in part or in full, to a homework file of his own, with corresponding confidential record be created automatically by the history program in the homework file, as a proof of being done by the user on his own. Or alternatively, the history program upon receipt of a user command, will scan a homework file to see if there is any part of user input, which may be copied from somewhere unknown to the history program, be identical to any part of inputs in the history file, if a match is found, then the history program will create a confidential record for the match in the homework file, by copying the information of method of input, time and identity of the computing machine(s) used, of the corresponding inputs found in the confidential history file.

This avoids a user from the unnecessary works of re-inputting text of his own.

It should be noted that the above embodiments are given by way of example only, and it will be obvious to those skilled in the art that various changes and modifications may be made without departing from the spirit of the present invention.

What is claimed is:

1. A computer-implemented method for preventing plagiarism among a plurality of files created respectively by a plurality of persons and submitted to a supervisory person in a learning environment, comprising the steps of:

monitoring user activities related to inputting content into a first file, thereby creating information related to said content of said first file;

storing said information into a first storage associated with said first file;

copying said information from said first storage into a second storage associated with a second file, upon said content being copied from said first file into said second file:

wherein said content is entered into said first file by a user himself or herself and not copied electronically from a source and then transferred from said source to said first file;

wherein said information uniquely identifies said content;

wherein said information includes information related to a method used by said user in entering said content into said first file;

wherein said first storage contains other information that uniquely identifies other content of said first file, and said other information and said other content is not copied into said second storage and said second file respectively;

wherein said information is stored confidentially in said first and second storages for preventing alteration by said user, and said content is text;

wherein said first file or said second file is a file of said plurality of files.

2. A computer-implemented method as claimed in claim 1, wherein said copying of said information into said second storage is automatically performed upon said content being copied into said second file.

3. A computer-implemented method as claimed in claim 1, wherein said information includes information related to the time of said content being entered into said first file and includes information related to an identity of an apparatus used by said user for entering said content into said first file.

4. A computer-implemented method as claimed in claim 1, wherein said information includes an indication of said content being entered into said first file by means of a keyboard or a means for hand-writing recognition.

5. A computer-implemented method as claimed in claim 1, wherein further comprising the step of:

detecting if any file, other than said first or second file, in said plurality of files plagiarized said content by searching in storages associated respectively with said plurality of files other than said first or second storage for said information.

6. An apparatus for preventing plagiarism among a plurality of files created respectively by a plurality of persons and submitted to a supervisory person in a learning environment, comprising:

means for monitoring user activities related to inputting content into a first file, thereby creating information related to said content of said first file;

means for storing said information into a first storage associated with said first file:

means for copying said information from said first storage into a second storage associated with a second file upon said content being copied from said first file into said second file;

wherein said content is entered into said first file by a user himself or herself and not copied electronically from a source and then transferred from said source to said first file;

wherein said information uniquely identifies said content;

wherein said information includes information related to a method used by said user in entering said content into said first file;

wherein said first storage contains other information that uniquely identifies other content of said first file, and said other information and said other content is not copied into said second storage and said second file respectively;

wherein said information is stored confidentially in said first and second storages for preventing alteration by said user, and said content is text;

wherein said first file or said second file is a file of said plurality of files.

7. An apparatus as claimed in claim 6, wherein said information includes an indication of said content being entered into said first file by means of a keyboard or a means for hand-writing recognition.

8. An apparatus as claimed in claim 6, wherein said information includes information related to the time of said content being entered into said first file and an identity of an apparatus used by said user for entering said content into said first file.

9. An apparatus as claimed in claim 6, wherein said means for copying includes automatically copying said information into said second storage upon said content being copied into said second file.

10. An apparatus as claimed in claim 6, wherein further comprising:

means for detecting if any file, other than said first or second file, in said plurality of files plagiarized at least a part of said content by searching in storages associated respectively with said plurality of files, other than said first or second storage, for said information.

11. An apparatus for preventing plagiarism among a plurality of files created respectively by a plurality of persons and submitted to a supervisory person in a learning environment, comprising:

means for monitoring user activities related to inputting content into a first file, thereby creating information related to said content of said first file;

means for storing said information into a first storage associated with said first file;

means for automatically copying said information from said first storage into a second storage associated with a second file, upon said content being copied from said first file into said second file;

wherein said content is entered into said first file by a user himself or herself by means of a means for hand-writing recognition or keyboard;

wherein said information uniquely identifies said content;

wherein said information includes information related to the time of said content being entered into said first file, and includes information related to an identity of an apparatus used by said user for entering said content into said first file, and said information also includes information related to a method used by said user in entering said content into said first file;

wherein said second file is not a duplication of said first file, and said first storage contains other information that uniquely identifies other content of said first file, and said other information and said other content is not copied into said second storage and said second file respectively;

wherein said information is stored in confidentially in said first and second storages for preventing alteration by said user and said content is text;

wherein said first file or said second file is a file of said plurality of files.

12. An apparatus for detecting if one of a plurality of files created respectively by a plurality of persons and submitted to a supervisory person in a learning environment contains plagiarized content, comprising:

means for comparing a piece of information associated with a file of said plurality of files with other pieces of information associated with other files of said plurality of files, and if a match is found, creating an alert signal;

wherein said piece of information uniquely identifies at least a part of said file, and includes information for identifying said part of said file as being entered into said file by a user himself or herself, and not being copied electronically from a source and then transferred from said source to said file;

wherein said piece of information is stored in a confidential manner for preventing alteration by said user and said piece of information includes information related to a method used by said user in entering said part of said file into said file.

13. A computer-implemented method for detecting if one of a plurality of files created respectively by a plurality of persons and submitted to a supervisory person in a learning environment contains plagiarized content, comprising the steps of:

comparing a piece of information associated with a file of said plurality of files with other pieces of information associated with other files of said plurality of files, and if a match is found, creating an alert signal;

wherein said piece of information uniquely identifies at least a part of said file, and includes information for identifying said part of said file as being entered into said file by a user himself or herself, and not being copied electronically from a source and then transferred from said source to said file;

wherein said piece of information is stored in a confidential manner for preventing alteration by said user and said piece of information includes information related to a method used by said user in entering said part of said file into said file.

14. An apparatus as claimed in claim 12, wherein said piece of information includes information related to time of said part of said file being entered into said file and includes information related to an identity of an apparatus used by said user for entering said part of said file into said file.

* * * * *